United States Patent
Koch

(10) Patent No.: US 8,128,004 B2
(45) Date of Patent: Mar. 6, 2012

(54) METHOD AND APPARATUS FOR OPERATING AN INJECTION VALVE

(75) Inventor: Achim Koch, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 801 days.

(21) Appl. No.: 12/161,501

(22) PCT Filed: Jan. 2, 2007

(86) PCT No.: PCT/EP2007/050002
§ 371 (c)(1),
(2), (4) Date: Jul. 18, 2008

(87) PCT Pub. No.: WO2007/085500
PCT Pub. Date: Aug. 2, 2007

(65) Prior Publication Data
US 2010/0224809 A1    Sep. 9, 2010

(30) Foreign Application Priority Data

Jan. 20, 2006 (DE) .......................... 10 2006 002 893

(51) Int. Cl.
*F02D 1/06* (2006.01)
*B05B 1/30* (2006.01)
*F02M 51/00* (2006.01)
*F16K 31/02* (2006.01)

(52) U.S. Cl. ...... 239/5; 239/584; 239/585.1; 239/585.2; 239/585.5; 251/129.15; 251/129.18

(58) Field of Classification Search .............. 239/5, 583, 239/584, 585.1, 585.2, 585.5; 251/129.15, 251/129.18; 137/1
See application file for complete search history.

(56) References Cited

U.S. PATENT DOCUMENTS

| | | | | |
|---|---|---|---|---|
| 6,450,424 | B1 * | 9/2002 | Horbelt | 239/585.1 |
| 6,814,313 | B2 * | 11/2004 | Petrone et al. | 239/585.1 |
| 2003/0132322 | A1 * | 7/2003 | Dantes et al. | 239/585.1 |
| 2005/0279867 | A1 * | 12/2005 | Ismailov | 239/585.1 |

FOREIGN PATENT DOCUMENTS

| | | |
|---|---|---|
| DE | 101 40 093 A1 | 2/2003 |
| DE | 102 35 196 A1 | 2/2004 |
| DE | 103 23 445 A1 | 12/2004 |
| EP | 1 065 678 A1 | 1/2001 |
| JP | 55-120111 A1 | 9/1980 |

OTHER PUBLICATIONS

Rahman et al., "Position Estimation in Solenoid Actuators", IEEE Transactions on Industry Applications, vol. 32, No. 3, 8 pages, 1996.

* cited by examiner

*Primary Examiner* — Len Tran
*Assistant Examiner* — Ryan Reis
(74) *Attorney, Agent, or Firm* — King & Spalding L.L.P.

(57) ABSTRACT

In order to operate an injection valve, a freewheeling operating state is controlled as the nozzle needle moves to its closing position, and a current through the coil is detected as a freewheeling current during freewheeling. As the nozzle needle moves to its closing position, a braking current pulse (I_BR) is generated on the basis of a time derivative (DI_DT_FW) of the freewheeling current and is impressed on the coil.

10 Claims, 4 Drawing Sheets

METHOD AND APPARATUS FOR OPERATING AN INJECTION VALVE

CROSS-REFERENCE TO RELATED APPLICATIONS

This application is a U.S. national stage application of International Application No. PCT/EP2007/050002 filed Jan. 2, 2007, which designates the United States of America, and claims priority to German application number 10 2006 002 893.7 filed Jan. 20, 2006, the contents of which are hereby incorporated by reference in their entirety.

TECHNICAL FIELD

The invention relates to a method and an apparatus for operating an injection valve.

BACKGROUND

Such injection valves are in particular used for metering fluid for a combustion process into a combustion chamber of a cylinder of an internal combustion engine.

The increasingly strict statutory regulations on permissible pollutant emissions of motor vehicles in which internal combustion engines are mounted require that the pollutant emissions be kept as low as possible in the operation of the internal combustion engine. This can be done on the one hand by reducing the pollutant emissions which form during the combustion of the air/fuel mixture in the specific cylinder of the internal combustion engine. On the other hand, exhaust gas after treatment systems are being used in internal combustion engines, that convert the pollutants formed during the combustion process of the air/fuel mixture in the respective cylinders into harmless substances. For this purpose, exhaust gas catalytic converters are used, which convert carbon monoxide, hydrocarbons and nitrogen oxides into harmless substances. Both the explicit influencing of the generation of pollutant emissions during combustion and the conversion of pollutant components with a high level of efficiency by using an exhaust gas catalytic converter require a very accurately adjusted air/fuel ratio in the cylinder in question.

In this context, it is desirable for the fuel metering through the corresponding injection valve to be as accurate as possible.

A method for controlling an electromagnetically operated switching valve is known from DE 102 35 196 A1. In order to operate a valve, a coil current is applied to an electromagnet, it being possible that the application of the coil current has a rising and a falling switching edge. The method involves superimposing a braking pulse on the coil current at a time interval from the switching edge of the valve actuating coil current to retard the movement of the valve body. The current in the coil of the electromagnet is measured with a current sensor and fed to an observer unit, which determines a path covered by the valve body. The path determined is fed to an impact energy observer. The observer determines as a function of the switching valve path, the impact energy generated from it during impact.

SUMMARY

A method and an apparatus for operating an injection valve can be created that is simple and accurate.

According to an embodiment, a method for operating an injection valve with a nozzle body, a recess with a fluid outlet, a nozzle needle, which is arranged in an axially movable manner in the recess and in a closed position, prevents fluid flow through the fluid outlet and then opens it again with an electromagnetic actuating drive, which has a coil and an armature which is mechanically coupled to the nozzle needle, and a return spring, which is mechanically coupled to the nozzle needle, may comprise the steps of: as the nozzle needle moves to its closed position, controlling a freewheeling operating state and detecting the current through the coil as a freewheeling current during freewheeling, and as the nozzle needle moves to its closed position, generating a braking current pulse as a function of a time derivative of the freewheeling current and impressing the braking current pulse on the coil.

According to another embodiment, an apparatus for operating an injection valve may comprise a nozzle body, a recess with a fluid outlet, a nozzle needle, which is arranged in an axially movable manner in the recess and, in a closed position, prevents fluid flow through the fluid outlet and then opens it again with an electromagnetic actuating drive, which has a coil and an armature which is mechanically coupled to the nozzle needle, and a return spring, which is mechanically coupled to the nozzle needle, the apparatus being operable, as the nozzle needle moves to its closed position, to control a freewheeling operating state and to detect the current through the coil as a freewheeling current during freewheeling and, as the nozzle needle moves to its closed position, to generate a braking current pulse as a function of a time derivative of the freewheeling current and to impress the braking current pulse on the coil.

According to a further embodiment, a point in time representative of the time position of the braking current pulse may be determined as a function of the time derivative of the freewheeling current. According to a further embodiment, a starting time in order to control the freewheeling operating state may be determined as a function of the fluid pressure which is applied to the injection valve. According to a further embodiment, a measurement delay with respect to the detection of the freewheeling current or the time derivative of the freewheeling current relative to the starting time in order to control the freewheeling operating state may be determined as a function of the fluid pressure which is applied to the injection valve. According to a further embodiment, the number of values of the freewheeling current to be detected or the time derivative of the freewheeling current may be determined as a function of the fluid pressure which is applied to the injection valve. According to a further embodiment, a braking peak current of the braking current pulse may be determined as a function of the fluid pressure.

BRIEF DESCRIPTION OF THE DRAWINGS

Examples of embodiments of the invention are explained in greater detail below with reference to schematic drawings. These drawings are as follows.

In all the figures, the same reference characters refer to the same or functionally comparable components.

DETAILED DESCRIPTION

Figure 1:
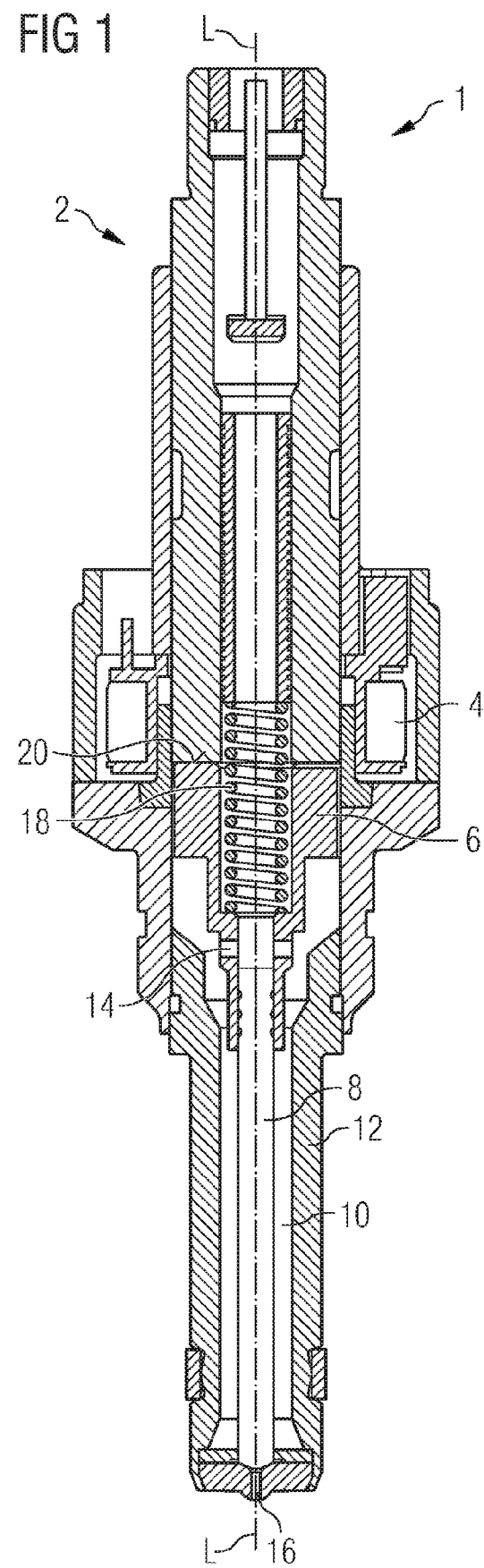
FIG. 1 an injection valve,
FIG. 2 an apparatus for operating the injection valve,
FIG. 3 a block diagram of parts of the apparatus for operating the injection valve in accordance with FIG. 2,
FIG. 4 a signal curve of a current through a coil and
FIGS. 5A to 5C additional signal curves.

According to various embodiments, in a method and a corresponding apparatus for operating an injection valve, the injection valve has a nozzle body, which encompasses a recess with a fluid outlet that has a nozzle needle that is arranged in an axially movable manner in the recess and that, in a closed position, prevents fluid flow through the fluid outlet and otherwise opens it. In addition, the injection valve has an electromagnetic actuating drive, which has a coil and an armature that are mechanically coupled to the nozzle needle. Furthermore there is provision for a return spring, which is mechanically coupled to the nozzle needle. A freewheeling operating state is controlled as the nozzle needle moves to its closed position, and a current through the coil is detected as a freewheeling current during freewheeling. As the nozzle needle moves to its closed position, a braking current pulse is generated as a function of a time derivative of the freewheeling current and is impressed on the coil. In this way, use is made of the finding that the time derivative of the freewheeling current is representative of the speed by means of which the nozzle needle moves to its closed position. It is therefore possible in this way to determine this speed in a simple manner without the additional need for a specific sensor to detect the speed of the nozzle needle. By impressing the braking current pulse as a function of the time derivative of the freewheeling current, an almost bounce-free impact of the nozzle needle on its closed position is achieved. This allows the unwanted post-injections of fluid through the injection valve associated with the corresponding bounce processes to be very easily avoided. In this way, lower requirements can also be imposed on the mechanical tolerances of the injection valve.

In accordance with an advantageous embodiment, a point in time as a function of the time derivative of the freewheeling current is determined that is representative of the position in time of the braking current pulse. In this way, use is made of the surprising finding that exactly this parameter of the braking current pulse is in particular appropriate for adaptation as a function of the speed of the nozzle needle with a view to avoiding a bouncing of the nozzle needle when it arrives at its closed position. In principle, a braking current pulse energy can also be determined as a function of the time derivative of the freewheeling current.

In accordance with a further advantageous embodiment, a starting time is determined in order to control the freewheeling operating state as a function of the fluid pressure which is applied to the injection valve. With appropriate selection of the starting time, the freewheeling operating state can be controlled in such a way while the maximum speed of the nozzle needle is achieved and thus the sensitivity of the freewheeling current is at its greatest. Therefore, in this way a particularly accurate adjusting of the speed characteristic in the region near the closed position of the nozzle needle can be achieved.

In accordance with a further advantageous embodiment, a delayed measurement with respect to the detection of the freewheeling current or the time derivative of the freewheeling current relative to the starting time is determined as a function of the fluid pressure which is applied to the injection valve. In this way, a pressure-dependent transient response of the freewheeling current can be taken into consideration very well.

In accordance with a further advantageous embodiment, a number of values of the freewheeling current to be detected or the time derivative of the freewheeling current is determined as a function of the fluid pressure which is applied to the injection valve. In this way, an appropriate interference suppression of the measured values can also be ensured when the values of the fluid pressure differ. In particular, a larger number of measured values can be detected in such a way than at a higher fluid pressure and a smaller closing period of time than at a lower fluid pressure and a longer closing period of time, whereby a very good interference suppression can be achieved.

In accordance with a further advantageous embodiment, a braking peak current of the braking current pulse is determined as a function of the fluid pressure which is applied to the injection valve. The braking peak current is in particular representative of the energy of the braking current pulse and is on account of the strong pressure dependence of the speed characteristic of the nozzle needle, a preferred parameter for the specific influencing of the speed characteristic of the nozzle needle, in particular in the vicinity of the closed position. Preferably, the speed characteristic referred to different pressure regions of the fluid pressure is influenced by the braking peak current and in a particularly preferred way; a particularly accurate adjustment of the speed characteristic within the specific pressure region then follows as a function of the starting point selection in time in order to control the freewheeling operating state.

An injection valve 1 (FIG. 1) comprises a housing 2, which can also be embodied in more parts if necessary and accommodates an electromagnetic actuating drive.

The electromagnetic actuating drive includes a coil 4. In addition, provision has been made for an armature 6, which is arranged in an axially movable manner in the injection valve 1 and coupled to a nozzle needle 8. The nozzle needle 8 is arranged in a recess 10 of a nozzle body 12.

A fluid leadthrough 14 is embodied in the armature 6, by means of which fluid from a fluid high-pressure accumulator is hydraulically coupled to the injection valve 1 and can flow into the recess 10 in accordance with the requirements. In addition, a fluid outlet 16 is arranged in the nozzle body 12, for example, in the form on one injection hole or a plurality of injection holes through which the fluid in a combustion chamber of a cylinder of an internal combustion engine can for example be metered.

In a closed position of the nozzle needle 8, this flow of fluid through the fluid outlet 16 is prevented. When not in the closed position, the nozzle needle 8 releases the flow of fluid through the fluid outlet.

Provision has been made for a return spring 18, which acts on the nozzle needle and does so preferably via the armature 6, which is mechanically coupled to the nozzle needle 8. The return spring 18 is embodied and arranged in such a way that said spring applies a force to the nozzle needle 8 and does so in such a manner that the nozzle needle without the influence of further hydraulic forces or by forces created by the electromagnetic actuating drive is in its closed position. The position of the nozzle needle depends on a balance of those forces, which are applied by the return spring, by the electromagnetic actuating drive and by the hydraulic forces to the nozzle needle.

By applying a current to the coil 4, a force is exerted on the armature 6, which leads to a movement of the armature 6 towards a contact-bearing surface 20, until the armature 6 rests against the contact surface 20 and the nozzle needle 8 is in an open position. If the application of current to the coil 4 is terminated subsequently, the nozzle needle then again moves back to its closed position on account of the forces of the return spring 18 and the fluid pressure acting on it.

Without further measures, this return movement of the nozzle needle 8 to its closed position on account of a slight hydraulic attenuation can cause a considerable bouncing action of the nozzle needle on reaching the closed position, which results in the fact that after the closed position of the nozzle needle has been reached for the first time, yet another post-injection of fluid or a plurality of post-injections of fluid may occur through the fluid outlet 16.

Figure 2:
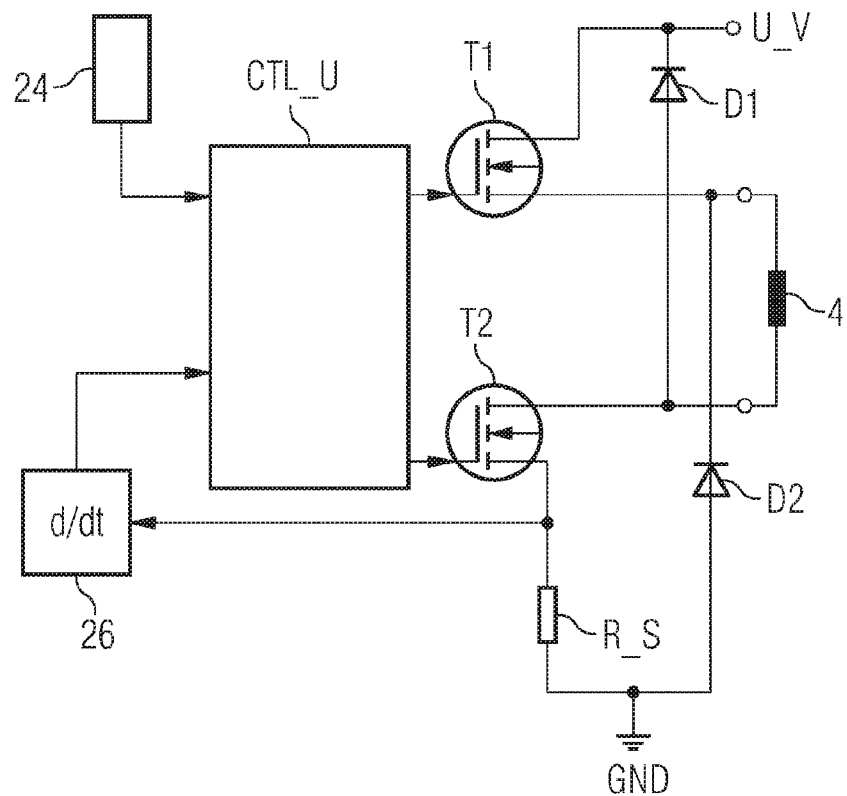

In order to operate the injection valve 1, provision has been made for a control apparatus (FIG. 2) to which a pressure sensor 24 is assigned, which preferably detects a fluid pressure in the high-pressure fluid accumulator. The control apparatus includes a control unit CTL_U, a power output stage, and a differentiator 26. The power output stage has a first transistor T1 of which the gate terminal is connected to an outlet of the control unit CTL_U in an electrically conductive manner. In addition, the power output stage has a second transistor T2 of which the gate terminal is connected to the control unit CTL_U in an electrically conductive manner.

Provision is made for a first diode D1 and a second diode D2. In addition, a voltage resistor R_S is arranged between the source output of the second transistor T2 and a reference potential GND. The voltage resistor R_S serves as a shunt resistor in order to detect a current I through the coil 4. An electrical voltage at a tapping point between the source output of the transistor T2 and the voltage resistor R_S is representative of the current through the voltage resistor R_S and is tapped as measurement for the current I through the coil and fed to the differentiator 26. The differentiator 26 is embodied to determine a time derivative DI_DT of the current I through the coil with the aid of its input signal. The output signal of the differentiator 26, which is representative of the time derivative DI_DT, is fed to the control unit CTL_U on the input side. The output signal of the differentiator 26 which is representative of the time derivative DI_DT is referred to below as the time derivative DI_DT of the current I through the coil 4 even if it is a corresponding voltage if necessary in this case.

The mode of operation of the power output stage is described below. U_V refers to a supply voltage, which can also be referred to as a supply potential. If a high level is applied to the gate terminal of the first transistor T1, then the first transistor T1 becomes conductive from its drain to its source. In addition, if the high level is applied to the second transistor T2 at its gate-side terminal, then the second transistor T2 also becomes conductive. The supply voltage U_V then decreases at the coil by a voltage drop at the voltage resistor R_S and voltage drops between the respective drain and source terminals of the transistors T1 and T2. In this case, the current I through the coil 4 increases.

If a lower level is subsequently pre-specified at the gate-side terminal of the first transistor T1, the transistor T1 then blocks and the diode D2 becomes conductive in the freewheeling state thereof. The voltage drop at the coil 4 is then given by the through-voltage of the diode D2, the voltage drop between the drain and the source of the transistor T2 and the voltage drop at the measuring resistor R_S and for example totals approximately 2 V. In this way, the current I through the coil 4 decreases in the freewheeling state thereof. If the diode D2 in the freewheeling state thereof is conductive then the power output stage is in a freewheeling operating state.

If the level at the gate-side terminal of both the first transistor and the second transistor T1, T2 are switched from high to low, then both the first diode D1 and the second diode D2 become conductive and the current I through the coil 4 drops very rapidly—a commutation takes place.

In connection with the generation of the actuating signals for the transistors T1 and T2 of the output stage through the control unit CTL_U during a closing process of the nozzle needle 8 from its open position to its closed position, the various embodiments makes use of the finding that during the freewheeling operating state, the time derivative DI_DT of current I through the coil 4, which is referred to as the time derivative DI_DT_FW of the freewheeling current FW, is representative of a speed V of the nozzle needle 8. This can be used in this way to determine the speed V of the nozzle needle 8 with high precision without the need of an additional position or speed sensor. This information is then used to determine a braking current pulse, which is impressed on the coil 8 as the nozzle needle 8 moves to its closed position and does so in such a manner that a bouncing of the nozzle needle 8 is largely prevented on reaching the closed position.

Figure 3:
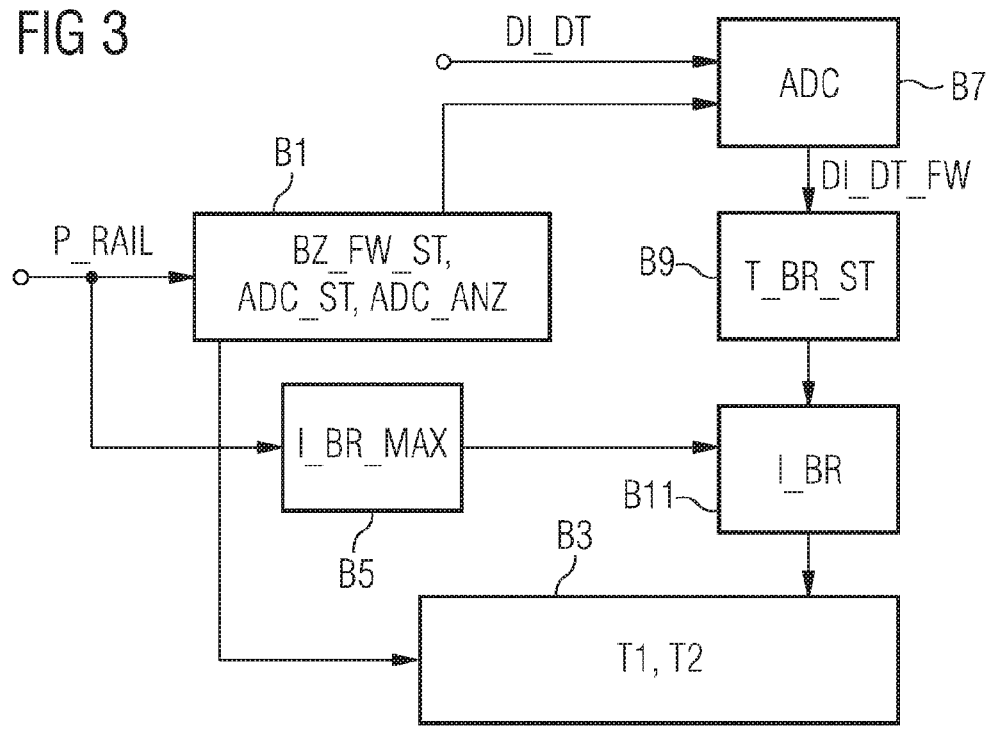

FIG. 3 shows a block diagram of the relevant parts of the control unit CTL_U. To this end, a block B1 is embodied to determine a starting time BZ_FW_ST in order to control the freewheeling operating state, a delayed measurement ADC_ST and a number of measured values ADC_ANZ to be detected. This preferably takes place as a function of the fluid pressure P_RAIL, which is detected by the pressure sensor 24. The fluid pressure P_RAIL, which is detected by means of the pressure sensor 24 in the fluid high-pressure accumulator, gives a rough approximation of the actual fluid pressure in the injection valve 1.

A soft landing of the nozzle needle is achieved in this way. In addition, the various embodiments makes use of the finding that the speed V of the nozzle needle 8 in particular on reaching the closed position strongly depends on the fluid pressure P_RAIL. In the fluid high-pressure accumulator, local pressure fluctuations are generated by the high-pressure pump assigned to the fluid high-pressure accumulator and also by the metering of fluid through the fluid outlet 16. In this way, an adaptation of the braking current preferably takes place separately for each movement of the nozzle needle 8 from its open position to its closed position.

The starting time BZ_FW_ST for controlling the freewheeling operating state is preferably determined in the block B1 as a function of the fluid pressure P_RAIL. This preferably takes place in the sense that it is operating in the freewheeling state while the speed V of the nozzle needle 8 is highest, because in this period of time the sensitivity of the current I through the coil 4 is at its highest. Preferably the starting time BZ_FW_ST of the current I through the coil 4 is determined as a function of a characteristic, which can for example be determined by tests on a test bed or also by simulation.

In addition, in the block B1 the delayed measurement ADC_ST is determined relative to the starting time BZ_FW_ST in order to control the freewheeling operating state, which is decisive for starting a detection of the time derivative DI_DT of the current I through the coil 4 by the control unit CTL_U. In addition, the number ADC_ANZ of measured values of the time derivative DI_DT of the current I through the coil 4 to be detected is also determined in the block B1. Preferably both the delayed measurement ADC_ST and the number ADC_ANZ of measured values to be detected are determined as a function of the fluid pressure P_RAIL and are indeed likewise preferably determined by means of a corresponding specific characteristic. This preferably takes place with due consideration of the fact that after the control of the freewheeling operating state has begun, the current I through the coil 4 must first resonate and that the period of time for this strongly correlates with the fluid pressure P_RAIL. In addition, a possibility of an interference suppression, which is in particular influenced by the number of measured values to be detected, is decisive as a function of the fluid pressure P_RAIL.

Alternatively, measured values of the current I through the coil can also be converted from analog to digital in the control unit CTL_U and then the time derivative DI_DT of the current I through the coil can be formed.

Depending on the respective starting time BZ_FW_ST determined in block B1 for controlling the freewheeling operating state, the transistors T1, T2 are correspondingly operated in the block B3.

To this end, a block B5 is embodied in order to determine a braking peak current I_BR_MAX of a braking current pulse I_BR. The braking peak current I_BR_MAX is preferably determined as a function of the fluid pressure P_RAIL. This likewise takes place as a function of a characteristic and different pressure regions of the fluid pressure P_RAIL are preferably allocated to fixed values of the braking peak current I_BR_MAX.

To this end, a block B7 is preferably embodied to carry out an analog-to-digital conversion of the time derivative DI_DT of the current I through the coil 4 and to do so as a function of the delayed measurement ADC_ST predetermined by the block B1 and the number ADC_ANZ of measured values to be detected. This analog-to-digital converted signal is then referred to as a time derivative DI_DT_FW of the freewheeling current below.

In a block B9, a starting time T_BR_ST of the braking current pulse is preferably determined as a function of the time derivative DI_DT_FW of the freewheeling current and indeed preferably by means of a corresponding characteristic, which was first of all determined by tests or corresponding simulations. In this connection, provision can also be made for a performance graph, which in addition depends on the fluid pressure P_RAIL or a plurality of characteristics can also be predetermined as a function of the fluid pressure P_RAIL.

The braking current pulse I_BR is then determined as a function of the starting time T_BR_ST and the braking peak current I_BR_MAX in block B11. The braking current pulse I_BR is then controlled by correspondingly actuating the transistors T1 and T2 of the power output stage. This is preferably done in such a way that, when the starting time T_BR_ST is reached, a high level is applied to both the transistor T1 and the transistor T2 on the gate side and only a low level is then applied on reaching the braking peak current I_BR_MAX of the transistor T1 on the gate side and thus blocks, and then, after a further predeterminable period of time, the low level is also applied to the transistor T2 on the gate side.

The period of time between reaching the braking peak current I_BR_MAX and controlling the low level can also be predetermined in a fixed manner in the case of the transistor T2 and may for example amount to approximately 300 µs. However, it can also for example depend on the fluid pressure P_RAIL and/or the speed V of the nozzle needle 8.

In a further embodiment, the braking peak current I_BR_MAX can for example be determined additionally or exclusively as a function of the time derivative DI_DT_FW of the freewheeling current.

Figure 4:
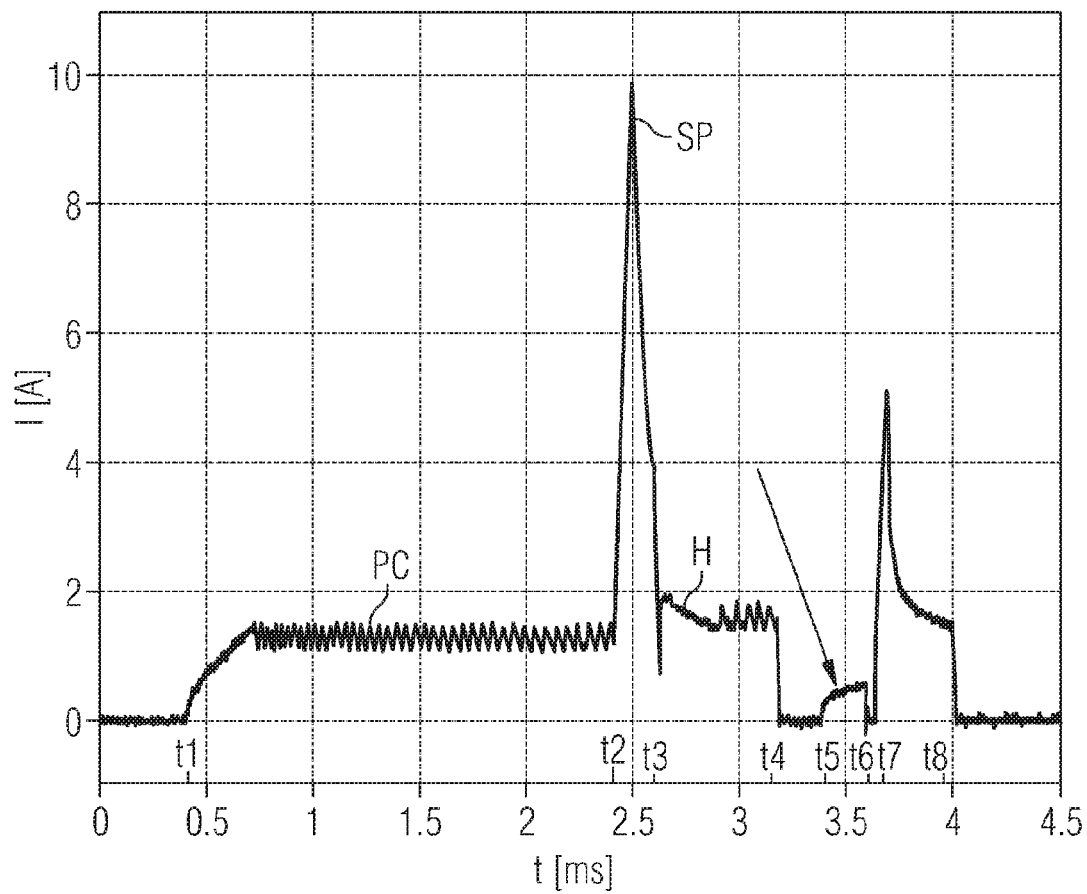

FIG. 4 discloses a typical curve of current I through the coil 4 via a control cycle of the injection valve 1. At a point in time t1, the control starts to move the nozzle needle 8 away from its closed position towards its open position, with a bias current first being set and this being done until a point in time t2 is reached. The bias current PC produces a pre-magnetization, through which the nozzle needle rapidly moves to its open position.

The power output stage is subsequently controlled in such a way that a peak current SP is set, which then ultimately results in the movement of the nozzle needle 8 to its open position. The peak current SP can for example be predetermined for a pressure region of the fluid pressure ranging from 40 to 70 bar with 10 ampere and for a pressure range of the fluid pressure from 70 to 120 bar with 13 ampere. Shortly before reaching the open position, a holding current H through the coil 4 is subsequently set from a point in time t3 to a point in time t4. At a point in time t4, the holding current H is then preferably commutated and the nozzle needle 8 moves back to its closed position. A point in time t5 then corresponds to the starting time BZ_FW_ST in order to control the freewheeling operating state, in the course of which the time derivative DI_DT_FW of the freewheeling current is determined. After the point in time t4, residual magnetism is reduced in the coil 4. This effect is more prolonged than the closing process of the nozzle needle 8. It depends on the current level of the holding current H, which for example amounts to 1.6 A or 2.7 A, in particular depending on the pressure region, thus for example 40-70 bar or 70-120 bar. This effect is superimposed on the movement of the nozzle needle 8. This brings about a change in the magnetic resistance in the magnetic circuit of the coil 4 and in this way a change in the current gradient during the reduction of the residual magnetism. As soon as an electrical current flow is permitted, the coil 4 thus switches to the freewheeling state and the superimposition of these effects can be seen in the current curve. The form of this curve is strongly dependent on the starting time of the freewheeling, on its period of time and particularly on the holding current level. Between the points in time t4 and t5, low levels are in each case applied to the transistors T1 and T2 on the gate side. Between the points in time t5 and t6, a high level is applied to the transistor T2 on the gate side. Between the points in time t6 and t7, low levels are in each case applied to the transistors T1 and T2 on the gate side.

The braking current pulse I_BR is then controlled at a point in time t7. The point in time t7 thus corresponds to a starting time t_BR_ST of the braking current pulse. The commutation of the current of the braking current pulse I_BR then takes place at a point in time t8.

Figure 5A:
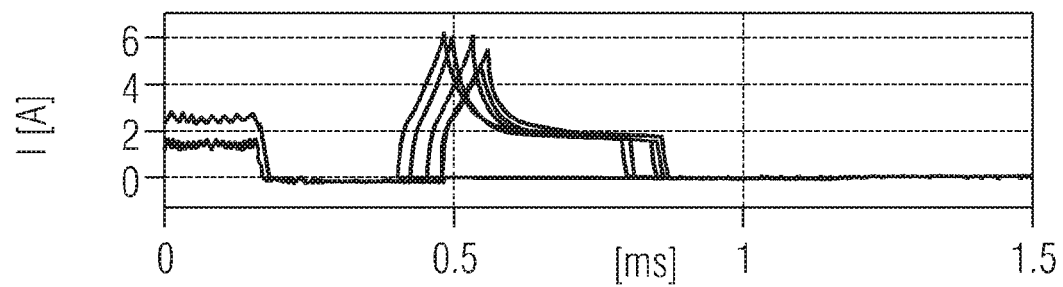
Figure 5B:
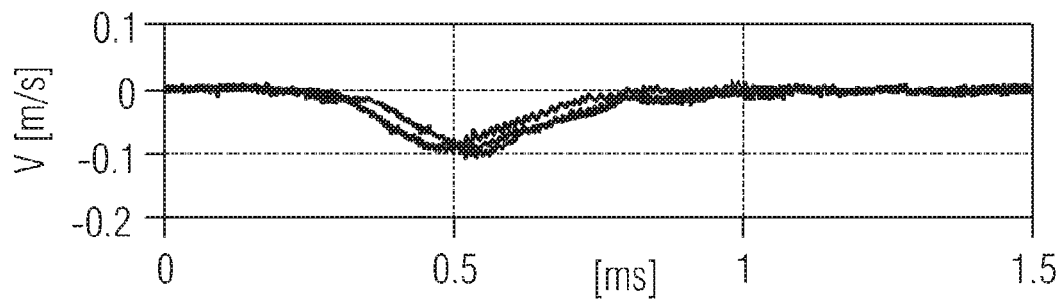
Figure 5C:
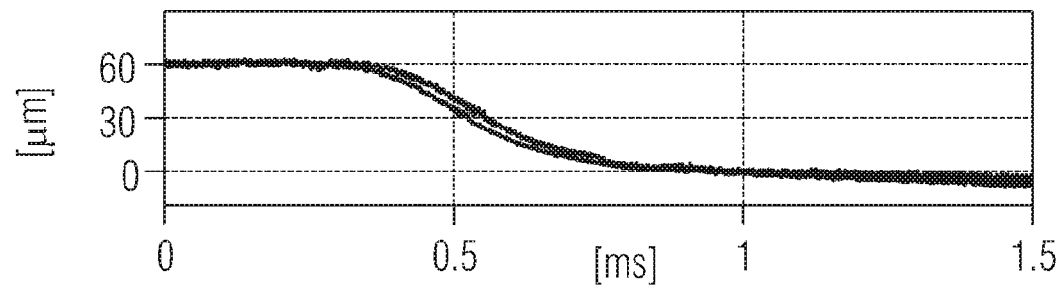

In FIGS. 5A to 5B, further exemplary curves of the current I at different fluid pressures P_RAIL, the speed v and the position of the nozzle needle in FIG. 5C are also shown.

The invention claimed is:

1. A method for operating an injection valve with a nozzle body, a recess with a fluid outlet, a nozzle needle, which is arranged in an axially movable manner in the recess and in a closed position, prevents fluid flow through the fluid outlet and then opens it again with an electromagnetic actuating drive, which has a coil and an armature which is mechanically coupled to the nozzle needle, and a return spring, which is mechanically coupled to the nozzle needle, the method comprising the steps of:

measuring a fluid pressure applied to the injection valve, determining, as a function of the measured fluid pressure applied to the injection valve, a starting time for controlling a freewheeling operating state, determining as a function of the measured fluid pressure applied to the injection valve, a starting time for generating a braking current pulse, as the nozzle needle moves to its closed position, controlling the freewheeling operating state beginning at the determined starting time for controlling the freewheeling operating state, and detecting the current through the coil as a freewheeling current during the freewheeling operating state, and as the nozzle needle moves to its closed position, beginning at the determined braking start time, generating a braking current pulse as a function of a time derivative of the freewheeling current and impressing the braking current pulse on the coil.

2. The method according to claim 1, wherein a point in time representative of the time position of the braking current pulse is determined as a function of the time derivative of the freewheeling current.

3. The method according to claim 1, wherein a measurement delay with respect to the detection of the freewheeling current or the time derivative of the freewheeling current relative to the starting time in order to control the freewheeling operating state is determined as a function of the fluid pressure which is applied to the injection valve.

4. The method according to claim 1, wherein the number of values of the freewheeling current to be detected or the time derivative of the freewheeling current is determined as a function of the fluid pressure which is applied to the injection valve.

5. The method according to claim 1, wherein a braking peak current of the braking current pulse is determined as a function of the fluid pressure.

6. An apparatus for operating an injection valve comprising:
- a nozzle body,
- a recess with a fluid outlet,
- a nozzle needle, which is arranged in an axially movable manner in the recess and, in a closed position, prevents fluid flow through the fluid outlet and then opens it again with an electromagnetic actuating drive, which has a coil and an armature which is mechanically coupled to the nozzle needle, and
- a return spring, which is mechanically coupled to the nozzle needle,
- a pressure sensor configured to measure a fluid pressure applied to the injection valve,
- the apparatus being operable:
  - to determine, as a function of the measured fluid pressure applied to the injection valve, a starting time for controlling a freewheeling operating state,
  - to determine as a function of the measured fluid pressure applied to the injection valve, a starting time for generating a braking current pulse,
  - as the nozzle needle moves to its closed position, to control the freewheeling operating state beginning at the determined starting time for controlling the freewheeling operating state, and detecting the current through the coil as a freewheeling current during the freewheeling operating state, and
  - as the nozzle needle moves to its closed position, beginning at the determined braking start time, to generate a braking current pulse as a function of a time derivative of the freewheeling current and impressing the braking current pulse on the coil.

7. The apparatus according to claim 6, wherein the apparatus is further operable to determine a point in time representative of the time position of the braking current pulse as a function of the time derivative of the freewheeling current.

8. The apparatus according to claim 6, wherein the apparatus is further operable to determine a measurement delay with respect to the detection of the freewheeling current or the time derivative of the freewheeling current relative to the starting time in order to control the freewheeling operating state as a function of the fluid pressure which is applied to the injection valve.

9. The apparatus according to claim 6, wherein the apparatus is further operable to determine the number of values of the freewheeling current to be detected or the time derivative of the freewheeling current as a function of the fluid pressure which is applied to the injection valve.

10. The apparatus according to claim 6, wherein the apparatus is further operable to determine a braking peak current of the braking current pulse as a function of the fluid pressure.

\* \* \* \* \*